2 Sheets--Sheet 1.

T. FAIRBANKS.

Platform-Scales.

No. 5,726. Reissued Jan. 13, 1874.

Witnesses:

Arnold Cornman

Wm. C. Dey.

Inventor: Thaddeus Fairbanks by his attorney T. D. Stetson

A.M. PHOTO-LITHOGRAPHIC CO. N.Y. (OSBORNE'S PROCESS.)

2 Sheets--Sheet 2.

T. FAIRBANKS.

Platform-Scales.

No. 5,726. Reissued Jan. 13, 1874.

Witnesses:

Arnold Hörmann.

Wm. C. Dey.

Inventor:

Thaddeus Fairbanks
by his att'y T. D. Stetson

AM. PHOTO-LITHOGRAPHIC CO. N.Y. (OSBORNE'S PROCESS.)

UNITED STATES PATENT OFFICE.

THADDEUS FAIRBANKS, OF ST. JOHNSBURY, VERMONT.

IMPROVEMENT IN PLATFORM-SCALES.

Specification forming part of Letters Patent No. 16,381, dated January 13, 1857; reissue No. 445, dated March 31, 1857; extended seven years; reissue No. 5,726, dated January 13, 1874; application filed December 12, 1873.

*To all whom it may concern:*

Be it known that I, THADDEUS FAIRBANKS, of St. Johnsbury, in the county of Caledonia and State of Vermont, have invented an Improved Platform-Scale for Weighing Railway-Cars, either alone or in train, or for various other useful purposes; and I do hereby declare that the same is fully described and represented in the following specification and the accompanying drawings, of which—

Figure 3:
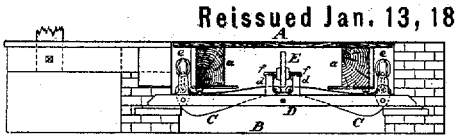
Figure 2:
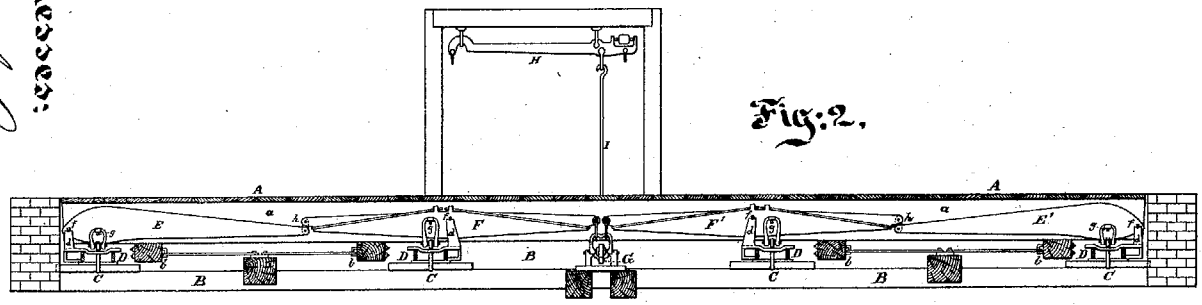
Figure 1:
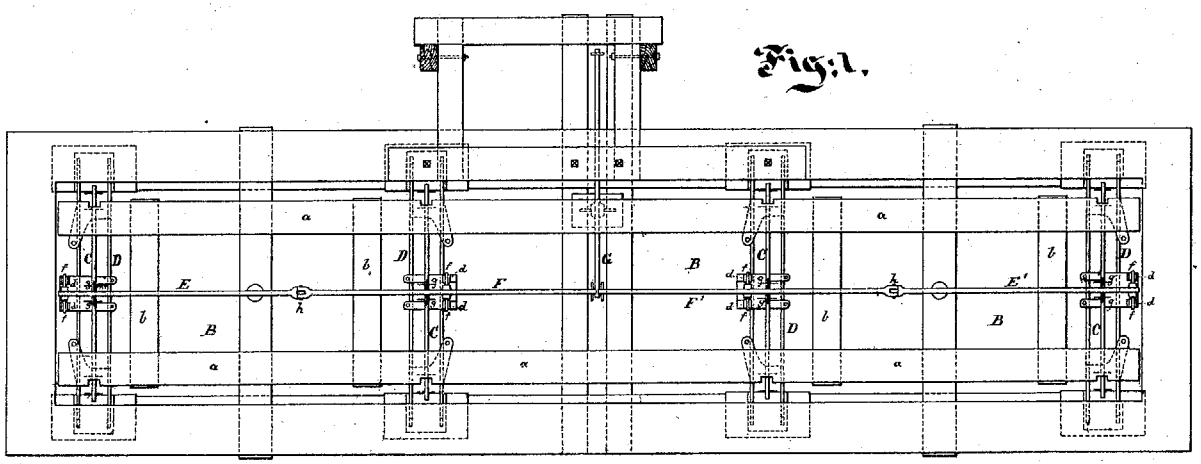
Figure 5:
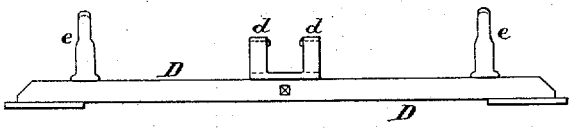
Figure 4:
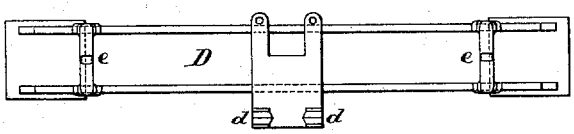
Figure 6:
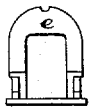
Figure 7:
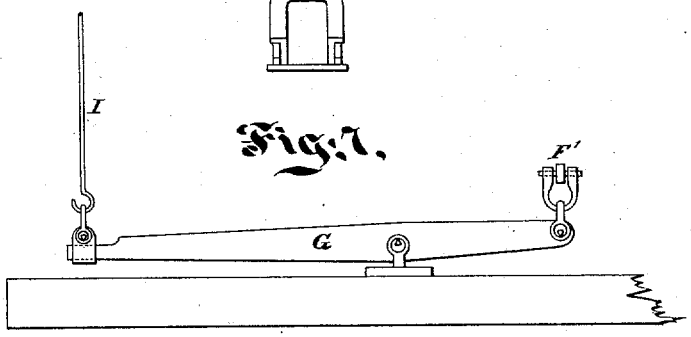

Figure 1 exhibits a top view of the framing and mechanism of said platform-scale; Fig. 2, a vertical and longitudinal section of the same; Fig. 3, a transverse section taken so as to exhibit one pair or set of the transverse bearing-levers. The succeeding figures are on a larger scale. Fig. 4 is a top view of one of the cross-frames or bridges with the supports for the several levers. Fig. 5 is a side elevation of the same; Fig. 6, an end view of the same. Fig. 7 is a side view of another lever.

In these drawings, A represents a long frame or platform, which is composed of longitudinal stringers *a a*, united by cross-ties *b b*, and covered by a flooring, which flooring is omitted in Fig. 1, in order to show more conveniently the system of levers by which the platform is supported and operated. This platform is arranged within a pit, B, and is supported on several sets of multiplying bearing-levers, C C, which are arranged transversely under the platform. They are supported in arched frames *e*, which, in turn, rest on firm cross-frames or bridges D D, as seen in the drawings. There is a set of two of said levers in each of said bridges. These cross-frames or bridges are made with bearings *d d*, for the knife-edge fulcrums *f f*, of longitudinal levers E F E′ F′ to rest upon. The arched standards *e*, before referred to, extend upward by the sides of the platform A. To the arched standards *e* the bearing-levers C C are suspended at or near their outer ends, their inner ends being connected to the knife-edge bearings *g g* of the longitudinal levers. The knife-edge bearings *g g*, by which the transverse or bearing-levers C transmit their motion or force to the said longitudinal levers, are arranged near to the fulcrums *f f* of said levers, as shown in the drawings. Each of the levers F F′ has its fulcrum arranged at its middle, and, therefore, in consequence of such an arrangement of its fulcrum and the arrangement of its knife-edge bearings, which support the hanging loops of its bearing-levers C C, such lever F or F′ becomes not only a multiplying but an equalizing-lever, the other two levers, viz., E E′, being multiplying levers.

The terms multiplying and equalizing, as applied to the levers, (as well as the functions to be performed by such levers,) will be readily understood by scale-makers. Each train of levers E and F or E′ and F′, are arranged with respect to each other and connected by a link, *h*, as shown in Fig. 2. The levers F and F′ are looped to the inner arm of a horizontal lever, G, extended at right angles to them, and connected to the steelyard or weighing-lever H by a connection-rod, I. (Shown in Figs. 2 and 7.

I employ counter sway rods or chains, such as are usually used to prevent injurious longitudinal or lateral swaying of the platform.

When my improved apparatus is used for weighing railway cars or trains, its platform is to be furnished with rails, and arranged in line with the railway-track, so that cars or carriages of the railway may pass on and off said platform.

One great advantage to be derived from my peculiar arrangement of the longitudinal and bearing levers consists in the facility with which the mechanism may be set up. The advantage of having an equalizing and multiplying lever in one bar, as described, is that, by means of it the machinery may be readily adapted to a platform of any desirable length. Its use in connection with the longitudinal and multiplying levers with which it is connected, gives to the combination important advantages.

While the sets of transverse and multiplying levers C C C C secure advantages in supporting the platform, the longitudinal lever E and the longitudinal trussed lever F (the latter made so as to operate as an equalizing and multiplying lever) perform their duties correctly without any of the bad effects of torsion, and enable me to continue the system and platform to any desirable extent, producing thereby a scale which, for railway purposes, is very perfect in its action, however great may be the difference of the loads weighed upon it.

The bridges D insure great firmness to the supports of the several levers. The extension of the arched standards *e* up the sides of the platform, reduces the depth of the pit or the walls or frame thereof in comparison to what would be necessary were the standards arranged underneath the platform, in the usual way. The levers C C and their bearings are placed entirely below the platform, as seen in Fig. 3. Room is afforded between the timbers of the platform for the necessary vertical play of the longitudinal levers E F, with the minimum of depth of pit.

By my combination and arrangement of the longitudinal line of levers with an additional series of levers, viz., the transverse levers C C C, I gain an extra or manifold increase of leverage, and thus render the apparatus useful for determining the weights of long and heavy railway-trains.

One obvious advantage due to the cross-frames or bridges D D, is to fix and hold very uniformly the distance apart of the standards *e e*.

I claim as my invention—

1. The combination of a series of transverse bearing-levers, C C, a longitudinal multiplying-lever, E, and a further longitudinal lever F, adapted to act as both an equalizing and a multiplying-lever, substantially as set forth.

2. The standards *e*, extending upward by the sides of the platform, and between it and the sides of the pit, in manner as stated, in combination with the transverse levers C, suspended therefrom, and with a series of central levers and connections, as herein set forth.

3. The cross-frames or bridges D, affording the supports for the bearings at the sides for the cross-levers C C, and also for bearings at the center for a series of levers and connections, to communicate to the weighing-beam, substantially as herein set forth.

In testimony whereof I have hereunto set my hand this 29th day of November, 1873, in the presence of two subscribing witnesses.

THADDEUS FAIRBANKS.

Witnesses:
THOMAS D. STETSON,
ALFD. WESTBROOK.